(12) United States Patent
Willson et al.

(10) Patent No.: US 10,998,730 B1
(45) Date of Patent: May 4, 2021

(54) ADAPTIVE SOLAR POWER BATTERY STORAGE SYSTEM

(71) Applicant: NeoVolta, Inc., Poway, CA (US)

(72) Inventors: Brent Willson, San Diego, CA (US); Rey Llanos, Oceanside, CA (US); John Hass, San Diego, CA (US); Tom Cole, Santee, CA (US)

(73) Assignee: NeoVolta, Inc., Poway, CA (US)

( * ) Notice: Subject to any disclaimer, the term of this patent is extended or adjusted under 35 U.S.C. 154(b) by 145 days.

(21) Appl. No.: 16/502,467

(22) Filed: Jul. 3, 2019

Related U.S. Application Data

(60) Provisional application No. 62/839,305, filed on Apr. 26, 2019.

(51) Int. Cl.
| | |
|---|---|
| *H02J 3/38* | (2006.01) |
| *H02S 40/32* | (2014.01) |
| *H02J 9/06* | (2006.01) |
| *H02J 7/35* | (2006.01) |
| *H02S 40/38* | (2014.01) |

(52) U.S. Cl.
CPC ............ *H02J 3/383* (2013.01); *H02J 7/35* (2013.01); *H02J 9/06* (2013.01); *H02S 40/32* (2014.12); *H02S 40/38* (2014.12); *H02J 9/068* (2020.01)

(58) Field of Classification Search
None
See application file for complete search history.

(56) References Cited

U.S. PATENT DOCUMENTS

| | | | |
|---|---|---|---|
| 645,576 | A | 3/1900 | Tesla |
| 685,953 | A | 11/1901 | Tesla |
| 685,955 | A | 11/1901 | Tesla |
| 2,872,568 | A | 2/1959 | Provaz |
| 2,998,484 | A | 8/1961 | Weber et al. |
| 3,005,040 | A | 10/1961 | Weber et al. |
| 3,380,067 | A | 4/1968 | Cervenka |
| 3,451,632 | A | 6/1969 | Jagos |

(Continued)

FOREIGN PATENT DOCUMENTS

| | | |
|---|---|---|
| AU | 2011203367 A1 | 7/2011 |
| CA | 2863963 A1 | 6/2015 |

(Continued)

*Primary Examiner* — Jared Fureman
*Assistant Examiner* — Joel Barnett
(74) *Attorney, Agent, or Firm* — Schiff Hardin LLP

(57) ABSTRACT

An adaptive solar power battery storage system is disclosed to capture alternative energy for use when desired, regardless of power generating circuit topology (AC or DC). The adaptive solar power battery storage system may be connected directly to solar panel cells (for DC-type solar panels) or to micro-inverters (for AC-type solar panels). The adaptive battery storage system can be configured to accept power from both energy sources simultaneously (AC or DC), or each individually. The adaptive solar power battery storage system may enable the operation of AC-type solar panels in the absence of utility power, which is ordinarily used to supply a reference signal to the micro-inverters, by converting stored DC battery power to AC to generate an emulated reference signal. The system may monitor the utility power and adjust the emulated reference signal to track the utility power to enable a safe transfer back to utility power once restored.

21 Claims, 4 Drawing Sheets

(56) References Cited

U.S. PATENT DOCUMENTS

| | | | |
|---|---|---|---|
| 3,589,600 A | 6/1971 | Vavrinec et al. | |
| 3,603,495 A | 9/1971 | Stejskal et al. | |
| 3,610,593 A | 10/1971 | Varga et al. | |
| 3,734,420 A | 5/1973 | Vavrinec | |
| 6,973,377 B2 | 12/2005 | Majstorovic et al. | |
| 7,404,720 B1 | 7/2008 | Frey et al. | |
| 7,433,794 B1 | 10/2008 | Berdichevsky et al. | |
| 7,602,145 B2 | 10/2009 | Renda | |
| 7,683,570 B2 | 3/2010 | Krauer et al. | |
| 7,683,575 B2 | 3/2010 | Berdichevsky et al. | |
| 7,719,232 B2 | 5/2010 | Kelty et al. | |
| 7,743,510 B2 | 6/2010 | Lazarevic | |
| 7,914,642 B2 | 3/2011 | Grohmann et al. | |
| 7,923,144 B2 | 4/2011 | Kohn et al. | |
| 7,940,028 B1 | 5/2011 | Hermann | |
| 8,049,460 B2 | 11/2011 | Krauer et al. | |
| 8,133,608 B2 | 3/2012 | Hermann et al. | |
| 8,195,414 B2 | 6/2012 | Fornage et al. | |
| 8,241,772 B2 | 8/2012 | Hermann et al. | |
| 8,242,739 B2 | 8/2012 | Krauer et al. | |
| 8,313,850 B1 | 11/2012 | LePort | |
| 8,324,863 B2 | 12/2012 | Nergaard | |
| 8,375,654 B1 | 2/2013 | West et al. | |
| 8,391,032 B2 | 3/2013 | Garrity et al. | |
| 8,398,808 B2 | 3/2013 | Grohmann et al. | |
| 8,408,097 B2 | 4/2013 | Grohmann et al. | |
| 8,493,032 B2 | 7/2013 | Krauer | |
| 8,618,775 B2 | 12/2013 | Hermann et al. | |
| 8,643,330 B2 | 2/2014 | Nergaard et al. | |
| 8,773,066 B2 | 7/2014 | Kelty | |
| 8,817,892 B2 | 8/2014 | Martin et al. | |
| 9,093,726 B2 | 7/2015 | Prilutsky et al. | |
| 9,153,990 B2 | 10/2015 | LePort et al. | |
| 9,221,343 B2 | 12/2015 | Tokarz et al. | |
| 9,263,901 B2 | 2/2016 | Boggs et al. | |
| 9,291,369 B2 | 3/2016 | West et al. | |
| 9,293,792 B2 | 3/2016 | Grace et al. | |
| 9,318,901 B2 | 4/2016 | LePort et al. | |
| 9,343,595 B2 | 5/2016 | Fu et al. | |
| 9,343,911 B2 | 5/2016 | LePort et al. | |
| 9,352,783 B2 | 5/2016 | Winberg et al. | |
| 9,397,504 B1 | 7/2016 | Narla et al. | |
| 9,461,579 B2 | 10/2016 | West et al. | |
| 9,496,710 B2 | 11/2016 | Narla et al. | |
| 9,509,240 B2 | 11/2016 | Holveck | |
| 9,527,403 B2 | 12/2016 | Mardall et al. | |
| 9,529,048 B2 | 12/2016 | LePort et al. | |
| 9,590,132 B2 | 3/2017 | Gonzalez et al. | |
| 9,688,252 B2 | 6/2017 | Gaffoglio et al. | |
| 9,692,038 B2 | 6/2017 | Tsuruta et al. | |
| 9,748,769 B2 | 8/2017 | Fornage | |
| 9,761,913 B2 | 9/2017 | Narla | |
| 9,941,555 B2 | 4/2018 | Hermann | |
| 10,389,121 B1* | 8/2019 | Sherry | H02S 10/12 |
| 2008/0285317 A1 | 11/2008 | Rotzoll | |
| 2011/0133552 A1* | 6/2011 | Binder | H02J 9/061 307/22 |
| 2012/0111444 A1 | 5/2012 | Hermann et al. | |
| 2012/0175964 A1* | 7/2012 | Yoscovich | H02J 3/381 307/82 |
| 2013/0015814 A1 | 1/2013 | Kelty et al. | |
| 2014/0077609 A1 | 3/2014 | Fornage | |
| 2014/0203646 A1 | 7/2014 | Belur et al. | |
| 2014/0212695 A1 | 7/2014 | Lane et al. | |
| 2014/0265573 A1* | 9/2014 | Kreutzman | F24H 1/185 307/31 |
| 2014/0326838 A1 | 11/2014 | West et al. | |
| 2015/0303016 A1 | 10/2015 | Sprague et al. | |
| 2016/0013642 A1 | 1/2016 | Linderman | |
| 2016/0107619 A1 | 4/2016 | Clarke et al. | |
| 2016/0141846 A1 | 5/2016 | Atchley et al. | |
| 2017/0005473 A1* | 1/2017 | Somani | H02J 3/381 |
| 2017/0047741 A1 | 2/2017 | Narla | |
| 2017/0093156 A1 | 3/2017 | Ozbek et al. | |
| 2017/0093157 A1 | 3/2017 | Pierquet et al. | |
| 2017/0177048 A1 | 6/2017 | Dimen | |
| 2017/0229266 A1 | 8/2017 | Cortes et al. | |
| 2017/0229268 A1 | 8/2017 | Goldman et al. | |
| 2018/0323725 A1* | 11/2018 | Cox | H02M 1/088 |
| 2019/0030983 A1 | 1/2019 | Miller et al. | |
| 2019/0296580 A1 | 9/2019 | Xing | |

FOREIGN PATENT DOCUMENTS

| | | |
|---|---|---|
| CH | 276827 A | 7/1951 |
| CH | 287034 A | 11/1952 |
| CH | 309309 A | 8/1955 |
| CH | 345927 A | 4/1960 |
| CH | 349305 A | 10/1960 |
| CH | 355189 A | 6/1961 |
| CN | 201967460 U | 9/2011 |
| CN | 102550426 A | 7/2012 |
| CN | 207265713 U | 4/2018 |
| CS | 202883 B1 | 2/1981 |
| CS | 209361 B1 | 11/1981 |
| EP | 0343439 A2 | 11/1989 |
| FR | 1170078 A | 1/1959 |
| FR | 1185451 A | 7/1959 |
| FR | 1306258 A | 10/1962 |
| FR | 1364323 A | 6/1964 |
| GB | 691538 A | 5/1953 |
| GB | 742717 A | 1/1956 |
| GB | 747532 A | 4/1956 |
| GB | 780068 A | 7/1957 |
| GB | 816711 A | 7/1959 |
| GB | 842483 A | 7/1960 |
| GB | 844465 A | 8/1960 |
| GB | 858122 A | 1/1961 |
| GB | 866077 A | 4/1961 |
| GB | 868946 A | 5/1961 |
| GB | 874350 A | 8/1961 |
| GB | 875880 A | 8/1961 |
| GB | 881779 A | 11/1961 |
| GB | 886650 A | 1/1962 |
| GB | 890438 A | 2/1962 |
| GB | 899259 A | 6/1962 |
| GB | 902031 A | 7/1962 |
| GB | 928369 A | 6/1963 |
| GB | 929151 A | 6/1963 |
| GB | 934568 A | 8/1963 |
| GB | 937169 A | 9/1963 |
| GB | 946257 A | 1/1964 |
| GB | 967367 A | 8/1964 |
| GB | 973614 A | 10/1964 |
| GB | 982149 A | 2/1965 |
| GB | 1111108 A | 4/1968 |
| GB | 1114023 A | 5/1968 |
| GB | 1127803 A | 9/1968 |
| GB | 1274249 A | 5/1972 |
| GB | 1321518 A | 6/1973 |
| GB | 1360383 A | 7/1974 |
| GB | 2086418 B | 3/1984 |
| GB | 2540623 A | 1/2017 |
| JP | 2018093334 A | 6/2018 |
| KR | 200405605 Y1 | 1/2006 |
| KR | 20060104803 A | 10/2006 |
| KR | 20090031389 A | 3/2009 |
| KR | 101663780 B1 | 10/2016 |
| KR | 20160140143 A | 12/2016 |
| KR | 20170062275 A | 6/2017 |
| KR | 20170085810 A | 7/2017 |
| KR | 20170102735 A | 9/2017 |
| WO | WO-2009011877 A2 | 1/2009 |
| WO | WO-2010131862 A2 | 11/2010 |
| WO | WO-2014047560 A1 | 3/2014 |
| WO | WO-2017136221 A1 | 8/2017 |
| WO | WO-2017223429 A1 | 12/2017 |
| WO | WO-2018010538 A1 | 1/2018 |

* cited by examiner

ADAPTIVE SOLAR POWER BATTERY STORAGE SYSTEM

CROSS-REFERENCE TO RELATED APPLICATIONS

The present application claims the benefit of the filing date of U.S. provisional application No. 62/839,305, filed on Apr. 26, 2019, the contents of which are incorporated herein by reference in their entirety.

TECHNICAL FIELD

Aspects described herein generally relate to adaptive solar battery storage systems and, more particularly, to an adaptive battery storage system that facilitates connections to both AC- and DC-type solar panels.

BACKGROUND

Conventional solar battery systems can only be connected to DC-type solar panels, limiting their flexibility and implementation.

BRIEF DESCRIPTION OF THE DRAWINGS/FIGURES

The accompanying drawings, which are incorporated herein and form a part of the specification, illustrate the aspects of the present disclosure and, together with the description, further serve to explain the principles of the aspects and to enable a person skilled in the pertinent art to make and use the aspects.

The exemplary aspects of the present disclosure will be described with reference to the accompanying drawings. The drawing in which an element first appears is typically indicated by the leftmost digit(s) in the corresponding reference number.

DETAILED DESCRIPTION

Figure 1:
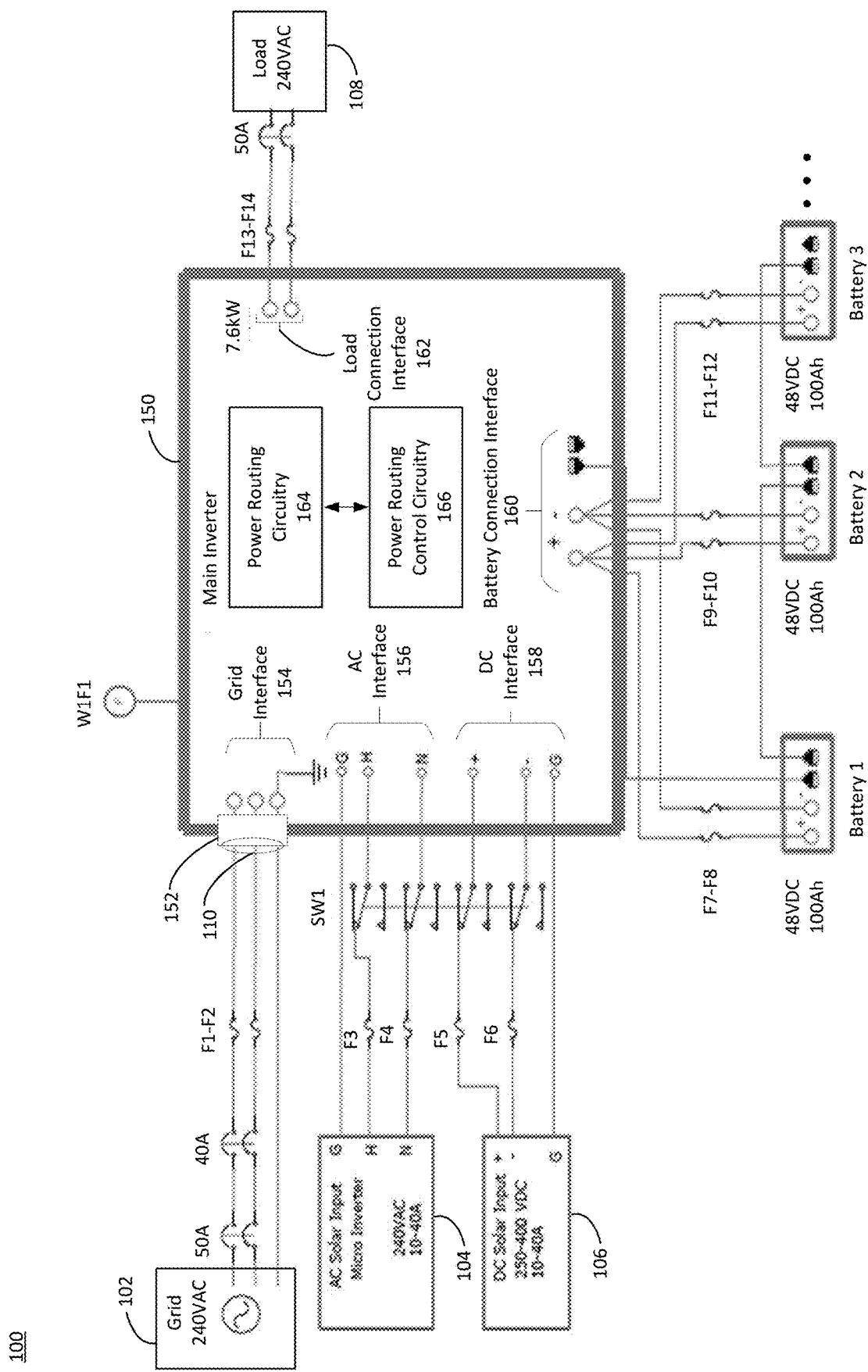
FIG. 1 illustrates a schematic illustration of an example adaptive solar power battery storage system, in accordance with an aspect of the disclosure.

In the following description, numerous specific details are set forth in order to provide a thorough understanding of the aspects of the present disclosure. However, it will be apparent to those skilled in the art that the aspects, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

In today's market it is common for businesses and homes to utilize solar energy, and the alternative energy market has generated a need for localized energy storage. Typically, there are contractual agreements between users to sell energy to a local energy provider and buy that energy back when needed. This is necessary because the amount of energy produced by the local alternative energy technology is almost never exactly what the user requires at any moment in time. In accordance with such contractual agreements, the energy providers offer to buy the user's energy at one price and sell that energy back to the user at a different price depending on the market situation. This can lead to increased costs for the alternative energy user that could be avoided if the user has an energy storage system. Moreover, beyond the cost savings to the user, there are also instances when the grid can be overloaded with energy and the added alternative energy produced is simply lost. Regional areas, such as Hawaii, for example, have mandated that a suitable energy storage system be installed for all new alternative energy installations to capture the energy for use when needed after sunset.

As a result, there is a need to capture and store solar energy at the user site, which is achieved by modern solar power storage systems, and as a result energy storage devices are commonly being used in many forms. The most common electrical energy storage devices incorporate batteries. Solar energy is among the top alternative energy technology that is currently being utilized, and is most common in the residential and small to medium sized businesses. Solar panels form a fundamental part of solar energy systems, and can be incorporated as stand-alone parts that deliver DC power (i.e., via "DC-type solar panels" or "DC solar panels") as well as those that implement integrated micro-inverters to deliver AC power (i.e., via "AC-type solar panels" or "AC solar panels"). However, the energy storage devices for residential and small to medium-sized businesses only accept DC power, and thus any AC power needs to be converted to DC power to charge the system batteries.

As noted above, with regards to the installation of solar panel power systems, there are two primary options for the solar panels: AC and DC. Most new installations utilize DC solar panels, while some legacy installations (as well as a smaller amount of new installations) utilize AC solar panels. Further complicating system installations, some solar power systems may include a mix of existing AC solar panels and DC solar panels that are later added to an existing installation. Therefore, a high number of current solar power systems still include AC solar panels, most of which utilize integrated micro-inverters to convert DC power generated via the solar cells to AC power.

Regardless of the type of solar panels that are implemented within the solar panel power system, each solar panel needs to interface with AC utility power connections, the storage batteries, and the end user load connection. The aspects described herein are directed to a device known as a main inverter, which handles the overall control of the solar power system. The aspects described herein are directed to a main inverter design that advantageously facilitates backward-compatibility with existing AC solar panels, which is not possible with current installation procedures. Instead, current installations require the arduous, expensive, and time-consuming task of modifying any existing AC solar panels to provide a DC output or, alternatively, the existing AC solar panels are replaced with DC solar panels.

The main inverter design aspects as discussed herein include interconnections that interface with the various solar power system components, and implement a system of relays, power routing circuitry, and power routing control circuitry. The main inverter aspects may also include other suitable components to ensure the proper routing of power within a solar power system. In particular, and as further discussed below, the main inverter aspects described herein ensure that the power generated from the solar panels is provided to charge the batteries, power the end user load, or supply power back to the utility grid based upon current operating conditions, which may include the state of the load, present load demands, the time of day, current power rates, the state of the utility power (i.e., whether the utility power is on or off), etc.

Moreover, the main inverter aspects as described herein enable an adaptive solar power battery storage system to capture alternative energy for use when desired, regardless of power generating circuit topology (AC or DC). As further discussed herein, this adaptive solar power battery storage system can be connected directly to solar panel cells (as is the case for DC-type solar panel configurations) or to micro-inverters that convert the energy produced by the solar panel cells (as is the case for AC-type solar panel configurations). The main inverter also enables a configuration in which the adaptive solar power battery storage system may accept power from both energy sources simultaneously (AC or DC), or each individually.

The aspects described herein incorporate several features not found in conventional solar power systems. For example, the main inverter aspects described herein provide dedicated input power connection points for each type of solar energy (i.e., dedicated AC-type and DC-type inputs). This allows a user to connect DC solar panels to input terminal block(s), while separate input terminal block(s) are also available for any AC solar panels. Having both types of inputs advantageously allows the user to connect both types of solar panels at the same installation location. This is useful for many reasons, one main advantage being that any existing (e.g., DC) solar panels can be used and, when additional solar energy is desired, it does not require the older (e.g., AC) solar panels to be removed or modified. This also minimizes the amount of equipment that the solar energy provider or installer needs to replace.

FIG. 1 illustrates a schematic illustration of an adaptive solar power battery storage system, in accordance with an aspect of the disclosure. The adaptive solar power battery storage system 100 is shown in FIG. 1 by way of example and not limitation, and may include additional, fewer, or alternate components than those depicted in FIG. 1. For example, although shown in FIG. 1 as including three batteries, aspects include the adaptive solar power battery storage system 100 being coupled to any suitable number of such components.

As shown in FIG. 1, the adaptive solar power battery storage system 100 includes a main inverter 150, which functions as an interface between the AC solar input 104, the DC solar input 106, the batteries, the grid 102, and the load 108. The AC solar input 104 and the DC solar input 106 may represent power inputs generated via any suitable number of AC solar panels and DC solar panels, respectively. For example, typical solar power systems include about 6-30 solar panels depending upon a particular application and power requirements. Continuing this example, the one or more AC solar panels may include a micro-inverter, which may be associated with a single AC solar panel or more than one AC solar panel. In any event, each of these micro-inverters may be connected in parallel with one another to form the AC solar input 104, which is coupled to the AC interface 156 of the main inverter 150. Furthermore, the output of any suitable number of DC solar panels may be connected in parallel with one other to form the DC solar input 106, which is coupled to the DC interface 158 of the main inverter 150.

With continued reference to FIG. 1, aspects include main inverter 150 implementing a separate input connection point for each type of solar panel. Specifically, the main inverter 150 includes the AC interface 156 and the DC interface 158, which may be implemented as one or more dedicated input terminal block(s) as noted above. As further discussed below, the main inverter 150 may be configured to route the AC power received via the AC interface 156 and the DC power received via the DC interface 158 in different ways based upon operating conditions.

For example, when DC solar panels undergo a wake-up mode each morning as the sun comes up, the main inverter 150 may use generated DC power received via the DC interface 158 to charge the system batteries. When the batteries are fully charged, the main inverter 150 may then convert the received DC power to AC power, which is supplied to the load 108. When the power utilized at the load 108 is exceeded (e.g., an amount of power is available in excess of a predetermined threshold), the main inverter 150 may then route the converted AC power to the grid 102 in accordance with an existing contractual agreement with the utility provider.

As another example, when the AC solar panels undergo a wake-up mode each morning when the sun comes up, the main inverter 150 may deliver generated AC power received via the AC interface 156 directly to the load 108. When the power utilized at the load 108 is exceeded (e.g., as noted directly above), the main inverter 150 may then convert the excess AC power to DC power to charge the system batteries. Once the batteries are fully charged, the main inverter 150 may then route the excess generated AC power to the grid 102.

In this way, the main inverter 150 may function to independently route AC and DC power from the AC and DC solar panel sources to various interconnected components associated with the adaptive solar power battery storage system 100. The main inverter 150 may do so in a concurrent manner. For example, the main inverter 150 may route power from the AC solar panels to the load 108, while at the same time routing DC power from the DC solar panels to charge the batteries.

To do so, the main inverter 150 may also include power routing circuitry 164, as further discussed below, which functions to convert (when necessary), condition, and route the AC and DC solar input voltages amongst the various components of the adaptive solar power battery storage system 100. For example, with respect to the DC solar panels, the power routing circuitry 164 may convert the DC voltage received via the DC interface 156 to a regulated and controlled voltage used to supply power to the main inverter 150. The power routing circuitry 164 may also be configured to convert the regulated DC voltage to an AC voltage (e.g., via additional inverter components not shown in FIG. 1 but further discussed below) that is delivered to the load 108 to provide power to the load 108 via the load connection interface 162. Moreover, the power routing circuitry 164 may utilize the regulated DC voltage to charge and store energy in the batteries.

To provide an example with respect to the AC solar panels, the power routing circuitry 164 may convert the AC solar input voltage received via the AC interface 158 to a regulated and controlled voltage, which may be utilized to deliver AC power to the load 108 via the load connection interface 162. The power routing circuitry 164 may further be configured to convert the AC solar input voltage to a DC voltage (e.g., via additional AC-DC converter components not shown in FIG. 1 but further discussed below) to charge the batteries. Thus, the main inverter 150 functions to selectively route power provided by the AC solar panels and/or the DC solar panels to the end user by regulating the supplied power and, in the case of the DC solar panels, converting and regulating the solar-generated DC voltage to an AC voltage and coupling this regulated AC voltage to the load 108.

As further discussed below, to facilitate this functionality the power routing circuitry 164 may be comprised of one or more relays, switches, AC-DC converters, DC-AC inverters, DC-DC converters, regulators, etc., which are not shown in detail in FIG. 1 for purposes of brevity. Additionally, aspects include the main inverter 150 implementing power routing control circuitry 166, which may include any suitable number and/or type of processors, hardware, and/or software that may work in conjunction with one another or independently. For instance, the power routing control circuitry 166 may include memory storing programmable instructions that may be executed via any suitable number and/or type of hardware processors (e.g., an application specific integrated circuit (ASIC), a complex programmable logic device (CPLD), field programmable gate arrays (FPGAs), etc. To provide an illustrative example, aspects include the power routing control circuitry 166 representing one or more processors storing firmware configured to execute, in conjunction with processing circuitry, the various techniques described herein with respect to the main inverter 150.

For example, the power routing circuitry 164 may be configured to monitor the status of various operating parameters associated with the adaptive solar power battery storage system 100. Additionally or alternatively, the power routing control circuitry 166 may communicate with and/or control the various components implemented via the power routing circuitry 164. In this way, the power routing circuitry 164 and the power routing control circuitry 166 may work in conjunction with one another to ensure that power is routed from the utility grid 102, the AC interface 156, and the DC interface 158 to the appropriate components of the adaptive solar power battery storage system 100 at the appropriate time and under the appropriate conditions.

To do so, aspects include the power routing control circuitry 166 further including, for instance, sensors, couplers, power sampling devices, etc., which may be configured to measure and/or track various operating parameters of one or more components of the adaptive solar power battery storage system 100. These operating parameters may include, for instance, the voltage, current, power, amplitude, frequency, etc., of inputs, outputs, and/or power generated via one or more components of the power routing circuitry 164 and/or the main inverter 150. As additional examples, and as further discussed herein, these operating parameters may be associated with, for instance, the AC voltage received via the AC interface 156, the DC voltage received via the DC interface 158, the status and/or capacity of the batteries, the status of the utility grid power 102, the status of the power delivered to the load 108, the status of the input and/or output associated with AC-DC converters and/or DC-AC inverters implemented as part of the power routing circuitry 164, etc. Thus, aspects include the power routing control circuitry 166 being coupled to various components of the power routing circuitry 164, which may be controlled and/or monitored via the use of control and/or data signals carried via appropriate signal interconnections (e.g., wired buses). These specific interconnections, as well as the components used to monitor the status of the various components of the adaptive solar power battery storage system 100 are not shown in FIG. 1 for purposes of brevity. In various aspects, the status monitoring as discussed herein may be performed in accordance with known techniques.

Moreover, because the main inverter 150 may potentially place solar-generated AC power onto the grid 102 when selling power back to the utility company, the main inverter 150 implements monitoring and safety measures, which are facilitated via the power routing circuitry 164 and the power routing control circuitry 166. These safety features ensure that AC power is not supplied to the grid 102 in a power outage situation to protect maintenance workers. For example, although the AC solar panel supplied voltage may be coupled to the utility grid power 102 when power is being sold back to the utility company, the auto-transfer switch 152 functions to otherwise isolate, or "island" the adaptive solar power battery storage system 100 from the utility grid power 102 as a safety measure. In an aspect, in the event of power outage, the power routing control circuitry 166 may control the state of the auto-transfer switch 152 to prevent AC power that is generated via the AC solar panels from being placed onto the grid 102.

Furthermore, in the event of such a power outage, aspects include the main inverter 150 supplying power to the load 108. This may be accomplished, for instance, via the power routing circuitry 164 coupling generated solar power from the AC interface 156 to the load 108, coupling generated solar power from the DC interface 158 to the load 108 (after DC-AC conversion), and/or coupling power from the batteries to the load 108 using the stored battery energy (after DC-AC conversion). Again, in any event, the auto-transfer switch 152 remains open to keep utility personnel safe during the power outage. When utility power is restored, aspects include the power routing control circuitry 166 switching over to utility power by closing the auto-transfer switch 152.

However, closing the auto-transfer switch 152 after restoration of utility power requires particular care when AC solar panels are implemented as part of a solar panel power system, and in particular when the AC solar panels are currently supplying AC power to the AC interface 156 that is being delivered to the load 108. This is because the typical power routing components implemented via the main inverter 150 (e.g., the power routing circuitry 164) are not tolerant to transient conditions when switching between different voltage sources. In particular, and as further discussed below, the micro-inverters implemented via the AC solar panels generate a reference signal waveform to convert DC power to an AC waveform, and sudden changes to the frequency (as well as other characteristics) of this reference signal may damage the micro-inverter circuitry.

Moreover, when the source associated with the power coupled to the load connection interface 162 changes, a smooth transition is required to maintain a stable power waveform at the load 108 and to prevent damaging components. Thus, the power waveform before and after switching power sources needs to be substantially the same, i.e., the waveforms should track one another in terms of various operating characteristics such as one or more of frequency, amplitude, phase, etc. This is likewise true for the reference signal source, as further discussed below. In accordance with the aspects described herein, this may be achieved by monitoring the utility grid power 102 via a utility line interface 110 (which may be monitored by the power routing control circuitry 166), and not closing the auto-transfer switch 152 until the current AC power being delivered to the load 108 is synchronized with the restored utility power waveform.

With regards to power synchronization after utility power has been restored, at the time utility power is restored the AC voltage delivered to the load 108 may be associated with one of several different voltage sources based upon the current system operating conditions, as noted above. These different power sources may be either an AC source (the utility grid power 102 or AC power delivered to the AC interface 156) or a DC source (DC power delivered to the DC interface 158 or the batteries). In the case of a DC source, the DC voltages are first inverted to an AC voltage prior to being delivered to the load 108. Moreover, DC-AC inverter circuitry included in the power routing circuitry 164 may output an AC power waveform at the load 108 that matches the properties of the (restored) utility grid power 102 measured via the utility line interface 110 prior to switching back to utility power.

However, in the case of switching between two different AC sources (i.e., the utility grid power 102 and the AC power delivered to the AC interface 156 by the AC solar panel micro-inverters), additional steps are required, which are achieved by the aspects described herein. The complication arises as a result of AC solar panels generating AC power via their respective micro-inverters only when two conditions are satisfied. The first of these is that typical AC solar panel micro-inverters will only output AC power when the coupled solar panel(s) generate a DC power wattage that exceeds a predetermined wattage threshold. The second of these conditions is that the micro-inverters will not generate AC power unless the reference signal is detected from the utility grid power 102, even if the wattage threshold is currently exceeded. This reference signal may be provided to the AC solar panels via the AC interface 156, for instance, or another interface not shown in FIG. 1 for purpose of brevity. This reference signal may include, for example, the utility power itself or a coupled/sampled version of the utility power waveform that is identical in frequency but may be smaller in amplitude.

The AC solar panel micro-inverters may utilize this reference signal in accordance with known techniques to perform switching for DC-AC inversion at a specific synchronized rate such that, upon converting a DC voltage to an AC output voltage, the generated AC output voltage waveform substantially matches, or tracks, one or more characteristics of the reference signal. In other words, the micro-inverters may convert the DC voltage to an AC voltage having the same (i.e., within some threshold tolerance) frequency, amplitude, phase, etc., as the reference signal. Because frequency tracking is particularly important in the context of this disclosure, frequency is used as the primary characteristic regarding the micro-inverter output tracking the reference signal, although other characteristics (e.g., voltage, phase, etc.) may likewise be matched for this purpose as well.

Therefore, under ordinary operating conditions when utility grid power is present and detected, the AC solar panel micro-inverters generate an AC power waveform that tracks the frequency of the utility power, because the utility power is being used as the reference signal. In other words, when the utility power is present, the micro-inverter of each respective AC solar panel generates an AC voltage that tracks the utility power waveform in terms of frequency, amplitude, phase, etc. Therefore, as long as the utility power is present, the reference signal is supplied to the micro-inverters, and the main inverter 150 may readily switch between the utility grid power 102 and the AC power delivered by the solar panels at AC interface 156, as these AC waveforms are nearly identical to one another in this scenario.

However, for traditional solar power systems, the AC solar panels will not generate power when the utility power is not present because the AC solar panel micro-inverters are unable to receive a reference signal. Therefore, aspects include the power routing circuitry 164 and the power routing control circuitry 166 working in conjunction with one other to convert the DC battery voltage to an emulated AC reference signal using a DC-AC inverter, as further discussed below with reference to FIG. 2. This emulated reference AC signal is then coupled to the micro-inverter of each AC solar panel (e.g., via the AC interface 156). The presence of this emulated reference signal in the absence of utility power enables the AC solar panel micro-inverter to continue to generate AC power in the event of a power outage, which allows the inverter 150 to deliver the solar-generated AC power to the load 108 when a power outage occurs instead of being limited to drawing power from the batteries.

This introduces an issue, however, when the utility grid power 102 is restored, because the emulated reference signal frequency (and thus the AC power generated by the micro-inverters) may not (and likely will not) match that of the restored utility power waveform. In particular, the utility power may generally vary in frequency between 58-62 Hertz, and may deviate in other ways depending upon the current grid conditions (e.g., amplitude variations). As a result, the auto-transfer switch 152 cannot be safely closed until the AC power generated via the AC solar panel micro-inverters sufficiently tracks the utility grid power measured at the utility line interface 110. Therefore, as discussed further below, aspects include the emulated AC reference signal being adjusted over time as part of a re-connection protocol until the AC voltage delivered to the AC interface 156 is synchronized with (e.g., has the same frequency within a threshold tolerance such as 0.1 Hz, 0.05 Hz, etc.) the restored utility grid power measured. Once the re-connection protocol has been completed, the auto-transfer switch 152 may close, and the AC solar panel micro-converters may then revert back to their pre-outage condition state, i.e., by utilizing the utility grid power as a reference signal to generate the AC power at AC interface 156.

Figure 2:
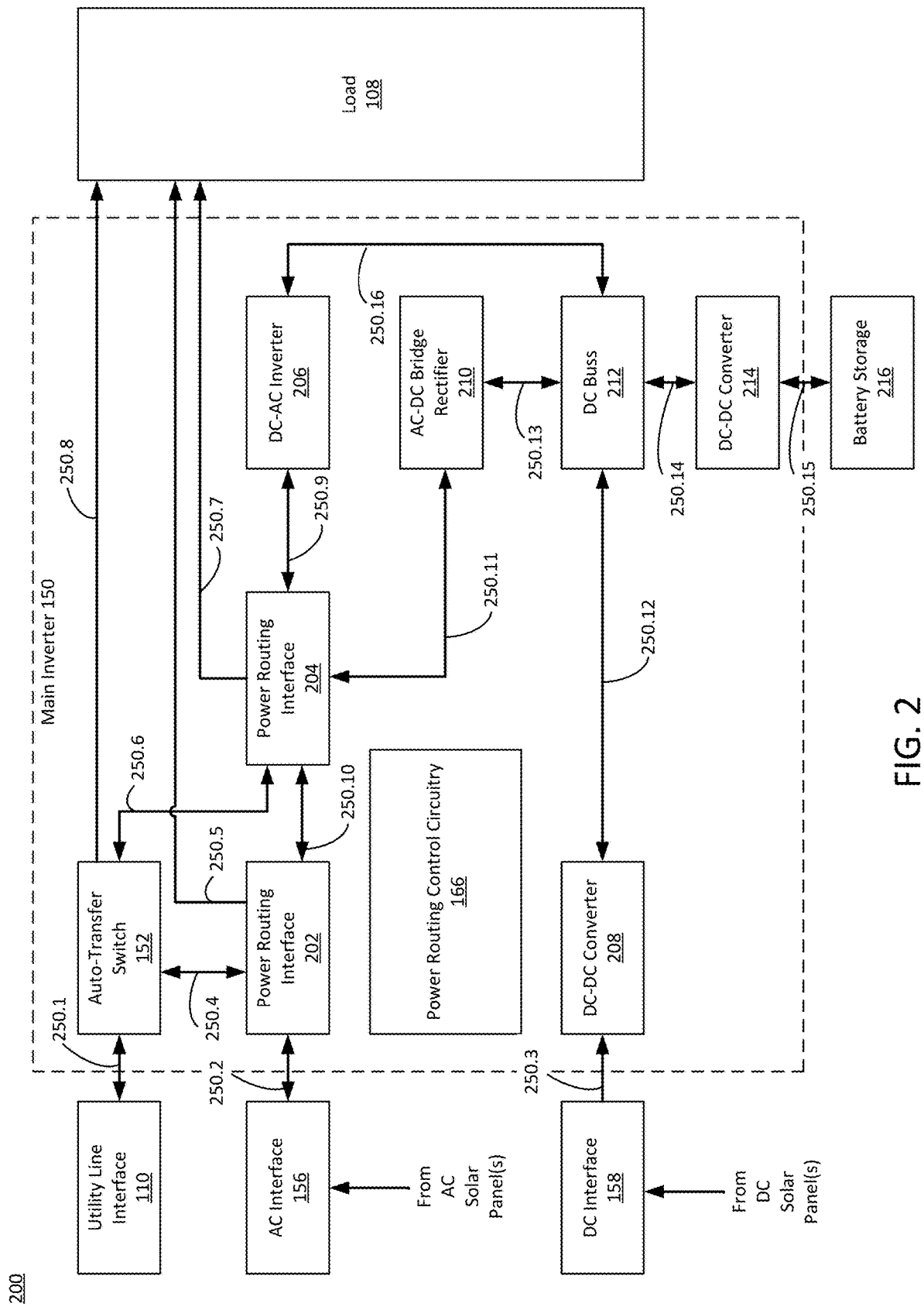
FIG. 2 illustrates a block diagram 200 of an example inverter architecture and power flow, in accordance with an aspect of the disclosure.

FIG. 2 illustrates a block diagram 200 of an example inverter architecture and power flow, in accordance with an aspect of the disclosure. The block diagram 200 as shown in FIG. 2 includes the main inverter 150 as shown in FIG. 1 with additional connections 250.1-250.15 and accompanying arrows to depict how the power may be routed within the adaptive solar power battery storage system 100. The block diagram 200 is provided for ease of explanation, and additional components, signals, and/or interconnections are not shown in FIG. 2 for purposes of brevity. For example, the connections 250.1-250.15 are shown in FIG. 2 as single connections for purposes of brevity, although aspects include the connections 250.1-250.15 including any suitable number and/or type of connections to facilitate the aspects as described herein.

For instance, the connections 250.1-250.15 may include any suitable number of both power routing connections as well as data and/or control connections between the various components. For example, the power routing control circuitry 166 may be interconnected with, communicate with, and/or control the various components of the main inverter 150 and/or other components to which the main inverter 150 is coupled. As an example, the power routing circuitry 164 as shown in FIG. 1 may be identified with the various components included as part of the main inverter 150 as shown in FIG. 2. Thus, the power routing control circuitry 166 may be configured to receive data from these various components associated with and/or coupled to the main inverter 150 to monitor the status of these components and/or to send control signals to these components to affect their respective states.

For example, the power routing circuitry 164 may include power routing interfaces 202, 204, which may be implemented as any suitable type of component configured to selectively route power in the directions denoted by the arrows as shown in FIG. 2 in response to control signals received via the power routing control circuitry 166. The power routing interfaces 202, 204 may thus be implemented as electronically-controllable solid state relays or other suitable types of electronically-controllable switches having any suitable number and/or type of poles and throws. Additionally, the power routing circuitry 164 may include the DC-AC inverter 206, the AC-DC bridge rectifier 210, DC-DC converters 208, 214, the DC buss 212, etc. Aspects include the power routing control circuitry 166 additionally or alternatively controlling the state of these components, which may be implemented in accordance with known circuit designs to achieve their respective functionalities, as further discussed herein.

To provide an illustrative example with regards to the aforementioned wake-up mode for the DC solar panels, the power routing control circuitry 166 may initially control the state of the DC-DC converter 208 to use the generated DC power received via the DC interface 158 to charge the system batteries. To do so, the power routing control circuitry 166 may cause the DC-DC converters 208, 214 to couple DC power to the battery storage 216 (e.g., via connections 250.3, 250.12, 250.14, 250.15). When the batteries are fully charged, the power routing control circuitry 166 may then control the DC-AC inverter 206 and the power routing interface 204 to convert the received DC power to AC power, which is then supplied to the load 108 (e.g., via connections 250.3, 250.12, 250.16, 250.9, 250.7). Finally, when the power utilized at the load 108 is exceeded, the power routing control circuitry 166 may route the converted AC power (i.e., the output of the DC-AC inverter 206 at connection 250.9) to the grid by controlling the state of the power routing interface 204 and the auto-transfer switch 152 (e.g., by closing these switches and using connections 250.3, 250.12, 250.16, 250.9, 250.6, 250.1).

To provide another illustrative example with regards to the aforementioned wake-up mode for the AC solar panels, the power routing control circuitry 166 may initially control the state of the power routing interfaces 202, 204 to deliver generated AC power received via the AC interface 156 directly to the load 108 (e.g., via connections 250.2, 250.5). When the power utilized at the load 108 is exceeded, the power routing control circuitry 166 may then control the state of the power routing interfaces 202, 204, the AC-DC bridge rectifier 210, and the DC-DC converter 214 to convert the excess AC power to DC power to charge the system batteries (e.g., via connections 250.2, 250.10, 250.11, 250.13, 250.14, 250.15). Once the batteries are fully charged, the power routing control circuitry 166 may then control the state of the power routing interface 202 and the auto-transfer switch 152 to couple the excess generated AC power to the grid 102 via the utility line interface 110 (e.g., via connections 250.2, 250.4, 250.1).

Again, in the event of a power failure, the AC solar panel micro-inverters are provided with an emulated reference signal so that the micro-inverters may continue to generate AC power. Upon the utility power being restored, the AC solar panel are once again supplied with the utility grid power (or another signal based on the utility grid power waveform) as the reference signal. This may be achieved, for instance, via the power routing control circuitry 166 controlling the DC-AC inverter 206 to generate a reference signal that has a power waveform. This reference signal waveform may be a typical AC waveform in terms of certain operating characteristics. For example, the reference signal waveform may have a frequency of 60.00 Hz and otherwise match typical operating characteristics of the utility power ordinarily received by the AC solar panel micro-inverters when utility power is present. As another example, the reference signal waveform may have a frequency that matches the operating characteristics of the utility power waveform just prior to (e.g., 30 seconds prior, 10 seconds prior, 5 seconds prior, etc.) the utility power going out.

This reference signal may thus be provided to the AC solar panel micro-inverters, for example, via the power routing control circuitry 166 controlling the state of the power routing interfaces 202, 204, to couple the reference signal to the micro-inverters at the AC interface 156 via connections 250.15, 250.14, 250.16, 250.9, 250.10, 250.2. Again, because the connections 250.1-250.15 may represent more than one type of connection, while the utility power is out the AC solar panel micro-inverters may continue to supply AC power to the load 108. This may be realized, for instance, via the power routing control circuitry 166 also controlling the state of the power routing interfaces 202, 204 to deliver generated AC power received via the AC interface 156 directly to the load 108 during the power outage via connections 250.2, 250.5.

While the main inverter 150 is operating in this state, the power routing control circuitry 166 controls the state of the auto-transfer switch 152 to be open such that the main inverter 150 is de-coupled from the utility line interface 110. Aspects include the power routing control circuitry 166 continuing to monitor the state of the utility power in this state and, once the utility power is restored, to initiate a re-connection protocol as further discussed below with reference to FIG. 3 once the utility power is stable.

Utility power stability may be determined in accordance with any suitable number of conditions. For example, once utility power is detected after utility power restoration, the power routing control circuitry 166 may compare one or more characteristics of the utility power waveform to a predetermined set of stable characteristics. This may include the utility power waveform being substantially unchanged for a threshold period of time, the frequency, amplitude, and/or phase of the utility power waveform being within a threshold range known to be acceptable, etc.

In any event, aspects include the power routing control circuitry 166 executing a re-connection protocol upon determining that the restored utility power waveform is stable. The re-connection protocol includes three main stages. The first of these stages is the power routing control circuitry 166 identifying one or more characteristics of the restored utility power waveform to which the emulated reference signal should be matched. Again, in the examples used herein, frequency is the primary matching characteristic, although aspects are not limited in this regard. The second of these stages is the power routing control circuitry 166 controlling the DC-AC inverter 206 to gradually adjust the emulated reference signal to track the identified characteristic(s) of the utility power waveform. Once the emulated reference signal and the restored utility power waveform match one another, the third stage is the power routing control circuitry 166 controlling the state of the auto-transfer switch 152, the power routing interfaces 202, 204, the DC-DC converter 214, and the DC-AC inverter 206 such that the utility power is once again supplied to the load 108 (i.e., the auto-transfer switch 152 is closed and power provided via the connections 250.1, 250.8) and the AC solar panel micro-inverters once again utilize the reference signal that is based upon the utility power versus the emulated reference signal generated via the DC-AC inverter 206.

Figure 3:
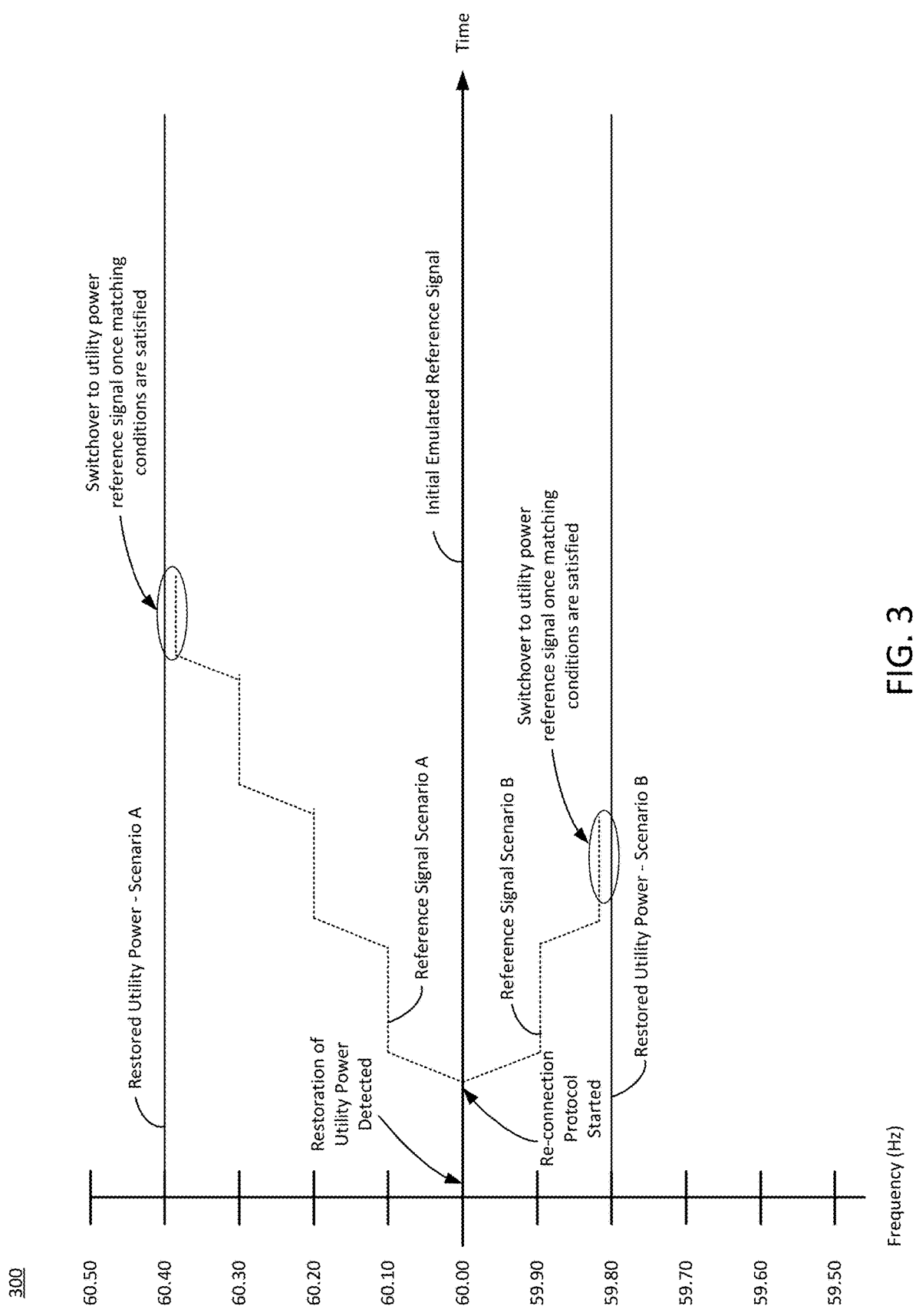
FIG. 3 illustrates an example timeline associated with the solar panel micro-inverters switching from the emulated reference signal back to a utility power reference signal, in accordance with an aspect of the disclosure.

Turning now to FIG. 3, which illustrates an example timeline associated with the solar panel micro-inverters switching from the emulated reference signal back to a utility power reference signal, an example initial emulated reference signal is shown. As shown in FIG. 3, the initial emulated reference signal has a frequency of 60.00 Hz and is being supplied to the AC solar panel micro-inverters during a power outage condition. FIG. 3 represents a frequency vs. time plot for a period of time following restoration of utility power. As shown in FIG. 3, the power routing control circuitry 166 determines that the restored utility power waveform is stable at a point in which the re-connection protocol is started.

FIG. 3 includes two different scenarios for the state of the utility power upon being restored. For scenario A, the restored utility power has a frequency of 60.40 Hz, whereas for scenario B the utility power has a frequency of 59.80 Hz. In either scenario, the initial emulated reference signal is 60.00 Hz, and thus forcing the AC micro-inverters to immediately switch from using the emulated reference signal as a reference signal to the restored utility power as a reference signal would damage these components, as this difference in frequency is too great. Thus, as shown in FIG. 3, for each scenario, once the power routing control circuitry 166 begins the re-connection protocol, the DC-AC inverter 206 is controlled in a manner to incrementally adjust the frequency of the emulated reference signal until the emulated reference signal frequency substantially tracks the frequency of the restored utility power waveform.

In various aspects, this may be accomplished by adjusting the frequency of the emulated reference signal in small increments until the gap between frequencies is sufficiently small that the switchover can safely occur. For instance, the increments may be predetermined such as the 0.1 Hz increments as shown in FIG. 3 or other increments such as 0.01 Hz, 0.05 Hz, etc. Moreover, aspects include the increments being adjustable based upon the particular components implemented via the main inverter 150 and/or the micro-inverters used in a particular AC solar panel configuration. To provide additional examples, the frequency increments may be proportional to or otherwise be a function of the initial difference between the emulated reference signal frequency and the utility power waveform frequency. For instance, a larger increment may be used when the initial frequency difference is greater to decrease the overall time required for the re-connection protocol to be completed.

In any event, as shown in FIG. 3, the re-connection protocol may be completed once the emulated reference signal frequency is sufficiently matched to that of the restored utility power waveform. This may include, for example, using one or more matching conditions that, when satisfied, trigger the power routing control circuitry 166 to switch the reference signal supplied to the AC solar panel micro-inverters from the emulated reference signal to the restored utility power. These matching conditions may include, for instance, the frequency of the emulated reference signal and the utility power waveform being within a threshold frequency of one another (e.g., 0.01 Hz, 0.05 Hz, 0.1 Hz, etc.). These matching conditions may also be predetermined or adjusted based upon the sensitivity, age, configuration, etc., of the components used within a particular system. Aspects include extending this frequency-matching principle via incremental adjustments to encompass additional or alternate characteristics of the emulated reference signal and the utility power waveform (e.g., phase, amplitude, etc.).

Figure 4:
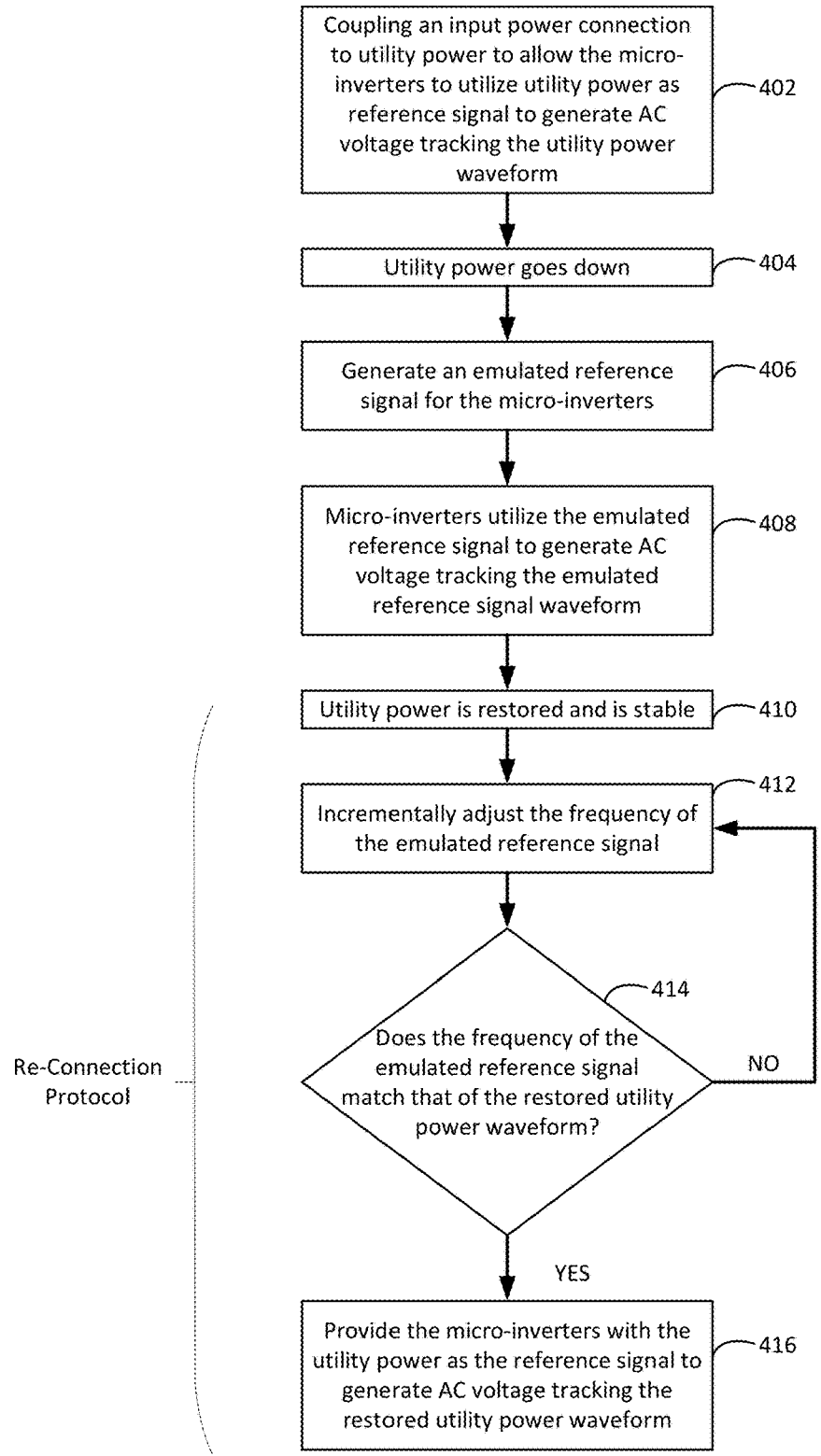
FIG. 4 illustrates an example method flow, in accordance with an aspect of the disclosure.

FIG. 4 illustrates an example method flow, in accordance with an aspect of the disclosure. With reference to FIG. 4, the flow 400 may be a computer-implemented method executed by and/or otherwise associated with one or more processors and/or storage devices. These processors and/or storage device may, for instance, be associated with the power routing circuitry 164 and/or the power routing control circuitry 166, for example, as shown in FIG. 2. In an aspect, flow 400 may be performed via one or more processors (e.g., those associated with the power routing control circuitry 166 as shown in FIG. 2) executing instructions stored on a suitable storage medium (e.g., a non-transitory computer-readable storage medium).

Method 400 may begin when the utility power is up, and the auto-transfer switch 152 couples the input power connection to utility power to allow the AC solar panel micro-inverters to utilize (block 402) the utility power as a reference signal. In doing so, the micro-inverters may output an AC voltage waveform that tracks the utility power waveform.

Method 400 may include the utility power going down (block 404). As a result, the auto-transfer switch also 152 opens, and the micro-inverters can no longer use the utility power reference signal.

Method 400 may include the generation (block 406) of an emulated reference signal for the micro-inverters. This may include the generation of the emulated reference signal via the DC-AC inverter 206 as discussed above with reference to FIG. 2.

Method 400 may include, upon providing the emulated reference signal to the micro-inverters, the micro-inverters utilizing (block 408) the emulated reference signal to generate an AC voltage that tracks the emulated reference signal. As discussed herein, the emulated reference signal may be generated using the DC power supplied by the batteries.

Method 400 may include, after the utility power has been down (block 404) for some threshold time period, being restored and being stable (block 410).

Method 400 may include initiating the re-connection protocol. As shown in FIG. 4, this may include incrementally adjusting (block 412) the frequency of the emulated reference signal.

Method 400 may include determining (block 414) whether the frequency of the emulated reference signal, upon being incrementally adjusted, tracks (i.e., substantially matches to within a threshold tolerance) the frequency of the restored utility power waveform. If so, then method 400 proceeds to block 416. Otherwise, method 400 may include repeating the act of incrementally adjusting (block 412) and determining (block 414) whether the frequency of the emulated reference signal tracks the frequency of the restored utility power waveform.

Method 400 may include providing (block 416) the micro-inverters with the utility power as the reference signal in place of the emulated reference signal. This may occur in conjunction with, for instance, the closure of the auto-transfer switch 152. In doing so, the AC voltage generated by the micro-inverters may once again track the restored utility power waveform.

CONCLUSION

The example components discussed herein are described as being associated with the power routing circuitry 164 and the power routing control circuitry 166 for ease of explanation and not by way of limitation, and such components of the power routing circuitry 164 and the power routing control circuitry 166 may be integrated as one device or separated into any suitable number of components implemented via the main inverter 150.

The aforementioned description of the specific aspects will so fully reveal the general nature of the disclosure that others can, by applying knowledge within the skill of the art, readily modify and/or adapt for various applications such specific aspects, without undue experimentation, and without departing from the general concept of the present disclosure. Therefore, such adaptations and modifications are intended to be within the meaning and range of equivalents of the disclosed aspects, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one aspect," "an aspect," "an exemplary aspect," etc., indicate that the aspect described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it is submitted that it is within the knowledge of one skilled in the art to affect such feature, structure, or characteristic in connection with other aspects whether or not explicitly described.

The exemplary aspects described herein are provided for illustrative purposes, and are not limiting. Other exemplary aspects are possible, and modifications may be made to the exemplary aspects. Therefore, the specification is not meant to limit the disclosure. Rather, the scope of the disclosure is defined only in accordance with the following claims and their equivalents.

Aspects may be implemented in hardware (e.g., circuits), firmware, software, or any combination thereof. Aspects may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general-purpose computer.

For the purposes of this discussion, the term "processing circuitry" or "processor circuitry" shall be understood to be circuit(s), processor(s), logic, or a combination thereof. For example, a circuit can include an analog circuit, a digital circuit, state machine logic, other structural electronic hardware, or a combination thereof. A processor can include a microprocessor, a digital signal processor (DSP), or other hardware processor. The processor can be "hard-coded" with instructions to perform corresponding function(s) according to aspects described herein. Alternatively, the processor can access an internal and/or external memory to retrieve instructions stored in the memory, which when executed by the processor, perform the corresponding function(s) associated with the processor, and/or one or more functions and/or operations related to the operation of a component having the processor included therein.

In one or more of the exemplary aspects described herein, processing circuitry can include memory that stores data and/or instructions. The memory can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

What is claimed is:

1. A power inverter device, comprising:
a utility grid interface configured to be selectively coupled to utility grid power;
a battery connection interface configured to be coupled to one or more batteries;
an alternating current (AC) interface configured to receive an AC voltage generated by an AC solar panel micro-inverter that is coupled to an AC solar panel, the AC voltage being generated by the AC solar panel micro-inverter using a reference signal such that the generated AC voltage tracks the reference signal, the reference signal being the utility grid power when the utility grid power is present; and
a power inverter configured to generate, as the reference signal supplied to the AC solar panel micro-inverter, an emulated reference signal using DC power supplied by the one of more batteries when the utility grid power is not present,
wherein the emulated reference signal is an AC waveform having an initial predetermined frequency upon the utility grid power no longer being present and the AC solar panel micro-inverter switching from using the utility grid power as the reference signal to using the emulated reference signal as the reference signal, and
wherein the initial predetermined frequency of the emulated reference signal is independent of a frequency associated with the utility grid power prior to the utility grid power no longer being present.

2. The power inverter device of claim 1, wherein an auto-transfer switch is coupled between the utility grid interface and the utility grid power, the auto-transfer switch selectively coupling the utility grid interface to the utility grid power.

3. The power inverter device of claim 1, wherein the power inverter is configured, upon the utility grid power being restored after not being present for a threshold time period, to adjust the emulated reference signal to track the restored utility grid power.

4. The power inverter device of claim 3, wherein the power inverter is configured to adjust the emulated reference signal to track the restored utility grid power such that the AC voltage generated by the AC solar panel micro-inverter tracks that of the restored utility grid power.

5. The power inverter device of claim 4, wherein the power inverter is configured to adjust the emulated reference signal to track the restored utility grid power by adjusting the initial predetermined frequency of the emulated reference signal to match a frequency of the restored utility grid power to within a threshold frequency.

6. The power inverter device of claim 5, wherein an auto-transfer switch is coupled between the utility grid interface and the utility grid power, the auto-transfer switch selectively coupling the utility grid interface to the utility grid power, and wherein the power inverter is configured to control a state of the auto-transfer switch to couple the utility grid interface to the restored utility grid power when a frequency of the emulated reference signal matches the frequency of the restored utility grid power within the threshold frequency.

7. The power inverter device of claim 6, wherein the power inverter is configured to switch the reference signal used via the AC solar panel micro-inverter from the emulated reference signal back to the restored utility grid power upon the auto-transfer switch coupling the restored utility grid interface to the utility grid power.

8. The power inverter device of claim 5, wherein the power inverter is configured to repeatedly adjust the frequency of the emulated reference signal in incremental frequency steps until the frequency of the emulated reference signal matches the frequency of the restored utility grid power within the threshold frequency.

9. The power inverter device of claim 8, wherein the incremental frequency steps are no larger than 0.1 Hertz (Hz).

10. The power inverter device of claim 8, wherein the incremental frequency steps are a function of a difference between the initial predetermined frequency of the emulated reference signal and the frequency of the restored utility grid power.

11. A computer-implemented method in a power inverter device, comprising:

selectively coupling, via power routing control circuitry, a utility grid interface to utility grid power;

generating, via an AC solar panel micro-inverter that is coupled to an AC solar panel, an AC voltage using a reference signal such that the generated AC voltage tracks the reference signal, the reference signal being the utility grid power when the utility grid power is present; and when the utility grid power is not present, generating, via a power inverter as the reference signal supplied to the AC solar panel micro-inverter, an emulated reference signal using DC power supplied by one of more batteries, wherein the selective coupling is made based upon a presence of the utility grid power and a presence of the AC voltage generated by the AC solar panel micro-inverter, wherein the emulated reference signal is an AC waveform having an initial predetermined frequency upon the utility grid power no longer being present and the AC solar panel micro-inverter switching from using the utility grid power as the reference signal to using the emulated reference signal as the reference signal, and wherein the initial predetermined frequency of the emulated reference signal is independent of a frequency associated with the utility grid power prior to the utility grid power no longer being present.

12. The computer-implemented method of claim 11, wherein the act of selectively coupling the utility grid interface to the utility grid power is performed via an auto-transfer switch, and further comprising:

monitoring, via power routing control circuitry, a state of the utility grid power; and controlling, via the power routing control circuitry, a state of the auto-transfer switch based upon one or more measured characteristics associated with the utility grid power and the emulated reference signal.

13. The computer-implemented method of claim 11, further comprising:

upon the utility grid power being restored after not being present for a threshold time period, adjusting, via the power routing control circuitry, the emulated reference signal to track the restored utility grid power.

14. The computer-implemented method of claim 13, wherein the act of adjusting the emulated reference signal to track the restored utility power comprises;

adjusting the initial predetermined frequency of the emulated reference signal to match a frequency of the restored utility grid power within a threshold frequency.

15. The computer-implemented method of claim 14, wherein the act of adjusting the emulated reference signal to track the restored utility power comprises repeatedly adjusting, via the power routing control circuitry, the frequency of the emulated reference signal by incremental frequency steps until the frequency of the emulated reference signal matches the frequency of the restored utility grid power within the threshold frequency, and further comprising:

controlling, via the power routing control circuitry, a state of an auto-transfer switch to couple the utility grid interface to the utility grid power when the frequency of the emulated reference signal matches the frequency of the restored utility grid power within the threshold frequency.

16. The computer-implemented method of claim 15, further comprising:

upon coupling the utility grid interface to the utility grid power, switching, via the power routing control circuitry, the reference signal supplied to the AC solar panel micro-inverter from the emulated reference signal back to the restored utility grid power.

17. A non-transitory computer-readable media having instructions stored thereon that, when executed by one or more processors associated with power routing control circuitry, cause the power routing control circuitry to:

selectively couple, via power routing circuitry, a utility grid interface to utility grid power;

generate, via an AC solar panel micro-inverter that is coupled to an AC solar panel, an AC voltage using a reference signal such that the generated AC voltage tracks the reference signal, the reference signal being the utility grid power when the utility grid power is present; and when the utility grid power is not present, generate, via a power inverter as the reference signal supplied to the AC solar panel micro-inverter, an emulated reference signal using DC power supplied by one of more batteries, wherein the emulated reference signal is an AC waveform having an initial predetermined frequency upon the utility grid power no longer being present and the AC solar panel micro-inverter switching from using the utility grid power as the reference signal to using the emulated reference signal as the reference signal, and wherein the initial predetermined frequency of the emulated reference signal is independent of a frequency associated with the utility grid power prior to the utility grid power no longer being present.

18. The non-transitory computer-readable media of claim 17, wherein the instructions to selectively couple the utility grid interface to the utility grid power further include instructions that, when executed by the power routing control circuitry, cause the power routing control circuitry to perform the selective coupling via an auto-transfer switch, to monitor a state of the utility grid power, and to control a state of the auto-transfer switch based upon one or more measured characteristics associated with the utility grid power and the emulated reference signal.

19. The non-transitory computer-readable media of claim 18, wherein the instructions to selectively couple the utility grid interface to the utility grid power further include instructions that, when executed by the power routing control circuitry, cause the power routing control circuitry to, upon the utility grid power being restored after not being present for a threshold time period, adjust the emulated reference signal to track the restored utility grid power.

20. The non-transitory computer-readable media of claim 18, wherein the instructions to selectively couple the utility grid interface to the utility grid power further include instructions that, when executed by the power routing control circuitry, cause the power routing control circuitry to, upon the utility grid power being restored after not being present for a threshold time period, adjust the initial predetermined frequency of the emulated reference signal to match a frequency of the restored utility grid power within a threshold frequency.

21. The non-transitory computer-readable media of claim 20, wherein the instructions to adjust the frequency of the emulated reference signal to match the frequency of the restored utility grid power further include instructions that, when executed by the power routing control circuitry, cause the power routing control circuitry to (i) repeatedly adjust the frequency of the emulated reference signal by incremental frequency steps until the frequency of the emulated reference signal matches the frequency of the restored utility grid power within the threshold frequency, (ii) control a state of an auto-transfer switch to couple the utility grid interface to the restored utility grid power when the frequency of the emulated reference signal matches the frequency of the restored utility grid power within the threshold frequency, and (iii) switch the reference signal used via the AC solar panel micro-inverter from the emulated reference signal back to the restored utility grid power upon the auto-transfer switch coupling the restored utility grid interface to the utility grid power.

* * * * *